Oct. 14, 1952　　　F. H. MILFORD　　　2,613,779
VANE TYPE HYDRAULIC CLUTCH OR COUPLING
Filed Oct. 12, 1950　　　　　　　　　　3 Sheets-Sheet 1

INVENTOR.
Francis H. Milford
BY Bodell & Thompson
ATTORNEYS

Oct. 14, 1952     F. H. MILFORD     2,613,779
VANE TYPE HYDRAULIC CLUTCH OR COUPLING
Filed Oct. 12, 1950     3 Sheets—Sheet 2

INVENTOR.
Francis H. Milford
BY Bodell & Thompson
ATTORNEYS

Oct. 14, 1952 F. H. MILFORD 2,613,779
VANE TYPE HYDRAULIC CLUTCH OR COUPLING
Filed Oct. 12, 1950 3 Sheets-Sheet 3

INVENTOR.
Francis H. Milford
BY Bodell & Thompson
ATTORNEYS

Patented Oct. 14, 1952

2,613,779

UNITED STATES PATENT OFFICE 2,613,779

VANE TYPE HYDRAULIC CLUTCH OR COUPLING

Francis H. Milford, Syracuse, N. Y.

Application October 12, 1950, Serial No. 189,860

4 Claims. (Cl. 192—58)

This invention relates to hydraulic power transmitters, for convenience called hereinafter hydraulic clutches. The term "clutch" may be somewhat inapt because the operation is not strictly a clutching operation.

It has for its object a clutch comprising a rotatable vaned driving member located within the cylindrical working chamber of a driven member and running with little clearance therein at the end edges and at the lateral edges of the vanes, the clutch being characterized by having the working chamber formed on its inner cylindrical side wall, at least for the most part of compressible resilient material which, under the pressure of the oil filling the work chamber, deforms and forms pockets which cause the driven member to be actuated, the formation of the pockets being due to the action of the centrifugal force generated by the rotating driving member. The pockets enlarge to various sizes in accordance with the centrifugal force and the input torque of the driving member. Preferably at least one of the end walls of the working chamber is also formed, at least for the most part, of similar compressible resilient material to provide a circulation for the oil and some slippage to avoid stalling of the clutch when the input torque is not momentarily sufficient to carry the load.

The invention consists in the novel features and in the combinations and constructions hereinafter set forth and claimed.

In describing this invention, reference is had to the accompanying drawings in which like characters designate corresponding parts in all the views.

Figure 1:
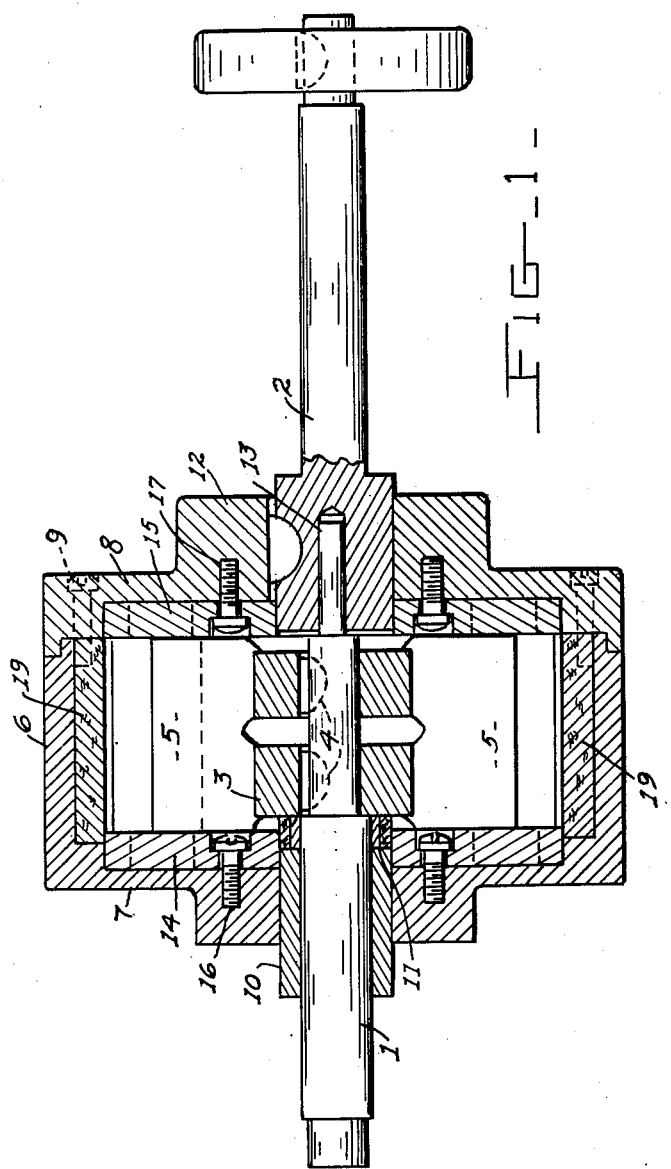
Figure 1 is a longitudinal sectional view of this clutch looking into the working chamber.
Figure 2:
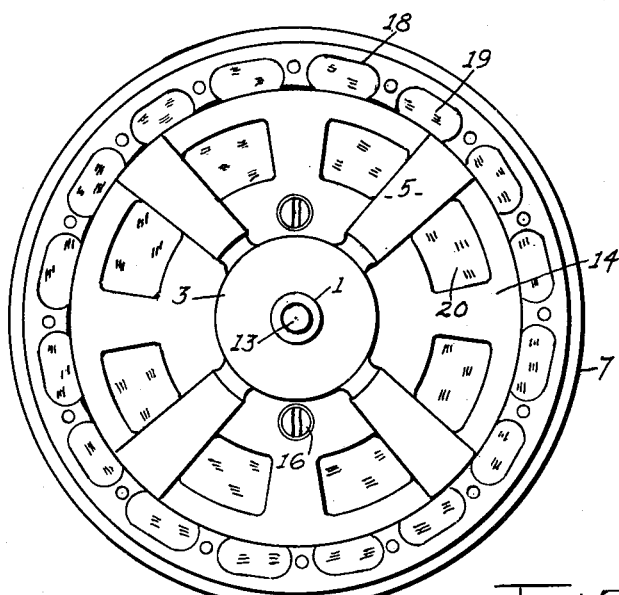
Figure 2 is an end view looking into the working chamber with one end wall of the working chamber removed.
Figure 3:
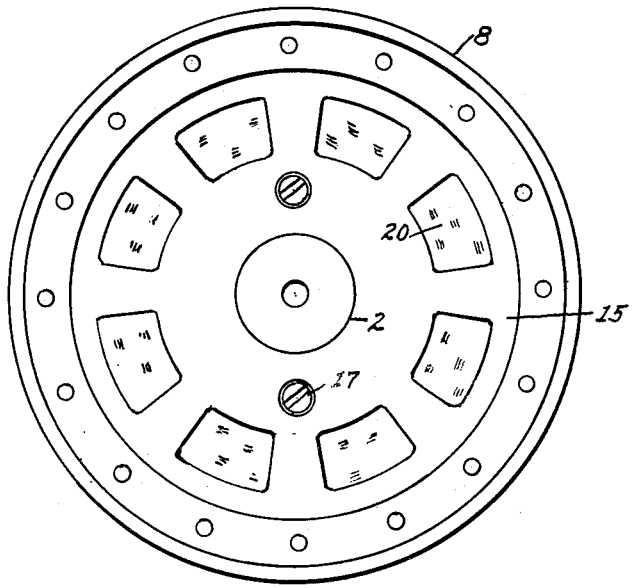
Figure 3 is a face view of the removed end wall.
Figure 4:
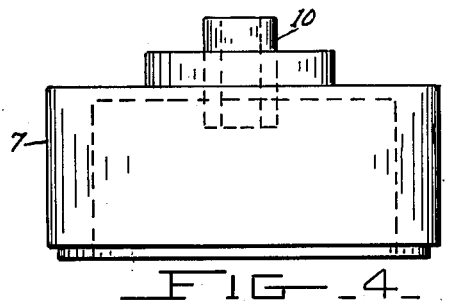
Figure 4 is a side elevation of the driven member.
Figure 5:
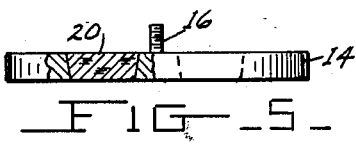
Figure 5 is an edge view, partly broken away, of one of the end walls of the working chamber.

1 designates the input shaft and 2 the output shaft. 3 designates the driving member which comprises a hub keyed at 4 to the input shaft 1 and vanes, as radial vanes 5. 6 designates the driven member, this being cylindrical in general form and confining a cylindrical working chamber in which the hub and vanes of the driving member 3 are located. The driven member 6 is provided with heads 7 and 8. One of which heads, as 8, is removable, it being held in position by suitable clamping means as screws 9. The head 7 is mounted to rotate about the input shaft 1, it being shown as mounted on a bushing 10 on the input shaft, which bushing is provided with an oil seal joint 11 between it and the shaft to avoid the seepage of oil from the working chamber along the shaft 1. The head 8 has a hub 12 mounted on the output shaft 2 to rotate therewith. The input shaft 1 is formed with a pilot bearing at 13 for the output shaft 2. The heads 7 and 8 are both provided with inserts 14 and 15 in the form of disks which form the end walls of the working chamber and support the compressible material of the end walls of the working chamber, as will be hereinafter described, these disks being held in position as by screws 16, 17.

As before mentioned, the clutch is characterized by the provision of pockets formed in compressible resilient material as, for instance, cork or rubber under the pressure of the oil generated by the centrifugal force of the rotating driving member 1, or the vanes 5 thereof. This compressible resilient material may be one continuous strip but due to the fact that it is difficult to secure, as by clamping, or vulcanizing the strips firmly in position without creeping and tearing, the strips are composed of sections and, as here shown, the annular wall of the driven member 6 is formed with recesses or pockets 18, and the blocks 19 of compressible resilient material are fitted into the recesses 18 and the outer faces of the blocks are normally arcuate and concentric with the axis of rotation of the coupling. Also, similar blocks 20 of cork or rubber, or other compressible, deformable, resilient material are located in pockets in the disks 14 and 15 forming the end walls of the working chamber. The end edges of the vanes 5 and also the lateral end edges thereof run close to the peripheral wall of the working chamber and to the walls of the disks 14 and 15 respectively.

Figure 9:
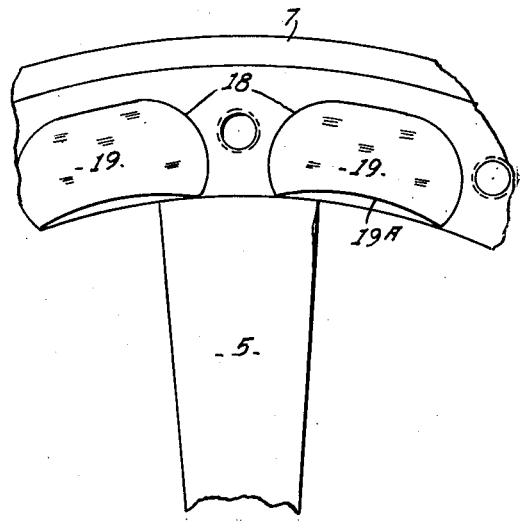
Figure 9 is an enlarged fragmentary view of the driving and driven members showing the location of the end edges of the vanes to the cylindrical wall of the working chamber.
Figure 6:
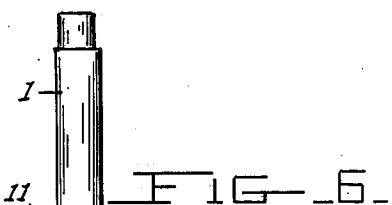
Figure 6 is an elevation of the driving member.
Figure 7:
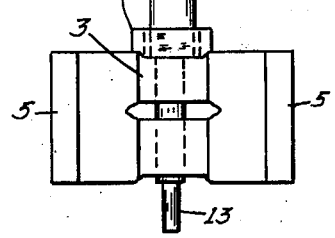
Figure 7 is a view, similar to Figure 5, of the other end wall of the working chamber.
Figure 7:
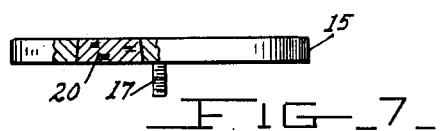
Figure 8:
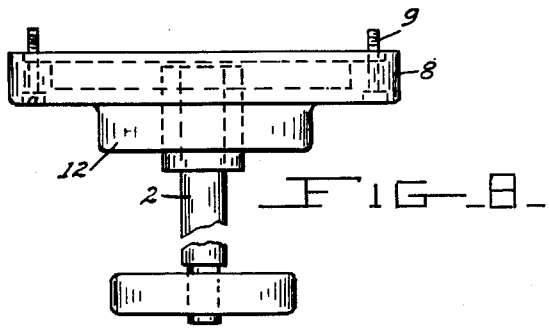
Figure 8 is an edge view of the removable head of the driven member, the output shaft being also shown.

During rotation of the input shaft 1 and the rotor or driven member 4, the oil in the working chamber is thrown outwardly centrifugally with a force in accordance with the speed of rotation and depresses, or deforms the blocks 19 initially, as shown by the lines 19A, Figure 9, providing shallow pockets. At the same time, as the centrifugal force increases the blocks are deformed to a greater extent forming deeper pockets in the blocks. The deformation action of the blocks 19 under the centrifugal force is a sort of flowing one. Thus the blocks transmit the force of the oil to the driven member 6 with little slippage and with no slippage when the input is sufficient to carry the load at a 1 to 1 ratio.

In starting the vehicle, after the vehicle commences to roll, less power will be required to keep it rolling and building up to a higher speed so that the throttle of the engine can be allowed to close more or less in accordance with the requirements of the road levels and grades, without much slipping of the clutch, and the vehicle can be started and moved and caused to travel at a 1 to 1 ratio at various speeds without slippage. As there is but a slight clearance between the end edges of the vanes 5 of the driving member, the blocks in the disks 14, 15, will also deform, or pockets will be formed therein when the input torque applied to the shaft 1 is not sufficient to overcome the static inertia, thus allowing the oil to circulate with more or less freedom back to the center of the working chamber. This same action will occur at all times when the input torque cannot carry the load at a 1 to 1 ratio when used in motor vehicles and thus transmit the torque very economically with no excess slippage because of the formation of the pockets in the blocks of resilient material, as if the input torque is not sufficient at any throttle position, the throttle can be opened wider and the pockets will be enlarged and transmit more power to the driven member.

By this hydraulic clutch or coupling, the disadvantages of hydraulic torque multipliers or converters is avoided, this disadvantage being that the torque multipliers or converters become rapidly less and less efficient as the ratio approaches a 1 to 1 ratio.

When this clutch or coupling is applied to motor vehicles, a reverse gearing is applied of any conventional construction. The reverse gearing forms no part of this invention.

What I claim is:

1. A hydraulic clutch comprising concentric rotatable driving and driven members, the driving member having vanes within the driven member, and the driven member having a cylindrical working chamber having end walls closing the ends thereof, the vanes running at their outer ends and lateral side edges close to the cylindrical wall and the end walls of the working chamber, the clutch being characterized by forming the cylindrical wall of the chamber, at least for the most part, of compressible, resilient, deformable material which deforms and forms recesses or pockets under the internal pressure generated in the fluid by the centrifugal force created during the rotation of the driving member.

2. A hydraulic clutch comprising concentric rotatable driving and driven members, the driving member having vanes within the driven member, and the driven member having a cylindrical working chamber having end walls closing the ends thereof, the vanes running at their outer ends and lateral side edges close to the cylindrical wall and the end walls of the working chamber, the clutch being characterized by providing the cylindrical wall and the end walls of the chamber, for the most part, of compressible, resilient material which deforms and forms recesses or pockets under the internal pressure created under the centrifugal force generated in the fluid during the rotation of the driving member.

3. A hydraulic clutch comprising concentric rotatable driving and driven members, the driving member having vanes within the driven member, and the driven member having a cylindrical working chamber having end walls closing the ends thereof, the vanes running at their outer ends and lateral side edges close to the cylindrical wall and the end walls of the working chamber, the clutch being characterized by forming the cylindrical wall of the chamber, at least for the most part, of compressible, resilient, deformable material which deforms and forms recesses or pockets under the internal pressure generated in the fluid by the centrifugal force created during the rotation of the driving member, the cylindrical wall of the working chamber being formed with recesses and blocks of compressible, resilient, deformable material filling the recesses, the faces of the blocks providing the cylindrical surface of the working chamber when the clutch is at rest and the blocks deforming to form the pockets of various depths under the action of the centrifugal force on the fluid in the working chamber.

4. A hydraulic clutch comprising concentric rotatable driving and driven members, the driving member having vanes within the driven member, and the driven member having a cylindrical working chamber having end walls closing the ends thereof, the vanes running at their outer ends and lateral side edges close to the cylindrical wall and the end walls of the working chamber, the clutch being characterized by providing the cylindrical wall and the end walls of the chamber, for the most part, of compressible, resilient material which deforms and forms recesses or pockets under the internal pressure created under the centrifugal force generated in the fluid during the rotation of the driving member, the cylindrical wall of the working chamber being formed with recesses, the compressible, resilient material being in the form of blocks fitting the recesses, and at least one of the end walls of the working chamber being provided with recesses and blocks fitting the recesses, the blocks which fill the recesses being of compressible, resilient, deformable material deformable under the action of the centrifugal force on the fluid in the working chamber to form pockets.

FRANCIS H. MILFORD.

REFERENCES CITED

The following references are of record in the file of this patent:

FOREIGN PATENTS

| Number | Country | Date |
|---|---|---|
| 770,906 | France | Mar. 29, 1934 |